April 7, 1964 A. A. HANKE ETAL 3,127,779
PULLEY
Filed Jan. 18, 1962

INVENTORS
ALVIN A. HANKE
MERLIN S. HANKE
BY
ATTORNEY

United States Patent Office 3,127,779
Patented Apr. 7, 1964

3,127,779
PULLEY
Alvin A. Hanke, Parma, Ohio, and Merlin S. Hanke, 501 Vineland Road, Bay Village 40, Ohio; said Alvin A. Hanke assignor to said Merlin S. Hanke
Filed Jan. 18, 1962, Ser. No. 167,037
10 Claims. (Cl. 74—230.14)

This invention relates to pulley wheels and more particularly to pulleys of the type designed to permit air to be passed axially through openings in the pulley.

A common and important application of pulleys is driving impellers of centrifugal fans which are used in such applications as forced air furnaces. These impellers are usually "squirrel cage blowers." The blower is journaled in a fan casing which collects the air delivered from the impeller and directs its flow into a connected duct for delivery into the heat exchanger compartment of the furnace. A pulley is secured to one end of the blower to transmit rotative force to it. Air supplied to the blower enters axially through openings in the ends of the blower and since a pulley is secured to one end, the supplied air must pass axially through apertures in the pulley. When a prior pulley is rotating, its spokes tend to obstruct the flow of air through these pulley apertures. Obviously any obstruction to this flow of air will materially effect the efficiency of the blower since this air is at least a substantial part of the input air of the blower.

The pulley of the invention is constructed to enhance, not restrict the flow of air through its body. When used with squirrel cage blowers the pulley of the invention assists the flow of air into the blower inlet and greatly increases the volume of air delivered to the blower. Because the pulley increases the flow of air to the blower, it is possible to reduce the size of blower normally required for a particular application.

The pulley has two pulley half-sections which are arranged in face to face aligned relation. Each pulley half-section includes an outer rim portion, a central hub portion and a plurality of spoke members connecting the outer rim portion to the central hub portion. The outer rims are in an abutting relation and are rigidly secured together to join the pulley half-sections. In addition the hub portion is secured to a central hub member. The spokes of both pulley sections are dished to form fan vanes which direct air axially through the pulley. The fan-like spoke members of each half-section are paired and oriented to face in the same direction. Preferably these spokes or vanes, are each curved symmetrically about an axial plane in order that their efficiency in serving as fan blades is equal in either direction of rotation without changing the position of the pulley or the shaft.

The invention further contemplates that the pulley sections be securely locked to a hub member. A portion of the hub member protrudes through a central opening in each section. The protruding portion of the hub member is crimped or otherwise formed over a locking rib on the outside face of the pulley section.

Accordingly, an object of this invention is to provide a new and improved pulley which assists air passing through the pulley when in use.

Another object of this invention is to provide a pulley having spokes which aid or enhance the flow of air through the pulley when it is in use.

Still another object of this invention is to provide a pulley having vaned spokes which cause air to flow through the pulley when the pulley is in use.

A more particular object of the invention is to provide pulley half-sections which are curved vanes paired and oriented in the same direction to cause air to move axially through the pulley when it is rotated.

A further object of this invention is to provide a new and improved pulley assembly wherein the pulley hub is fixedly locked to the pulley sections.

Other objects and a fuller understanding of the invention may be had by referring to the following description and claims taken in conjunction with the accompanying drawings in which:

Figure 2:
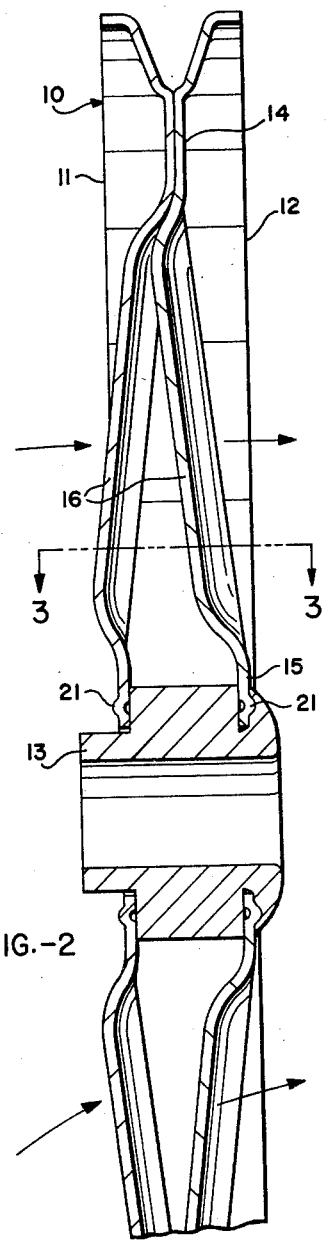
FIGURE 2 is a cross-sectional view of the pulley of the invention taken along the line 2—2 of FIGURE 1.

Referring now to the drawing which shows the preferred embodiment of the invention, a composite pulley assembly is generally indicated by the reference character 10 in FIGURE 2. The pulley assembly 10 has half-sections or flanges 11, 12 arranged in face to face aligned relation. A hub member 13 is interposed between the pulley half sections 11, 12 and axially coextensive therewith. In the preferred and disclosed arrangement this hub projects through and past apertures in the flanges.

Figure 1:
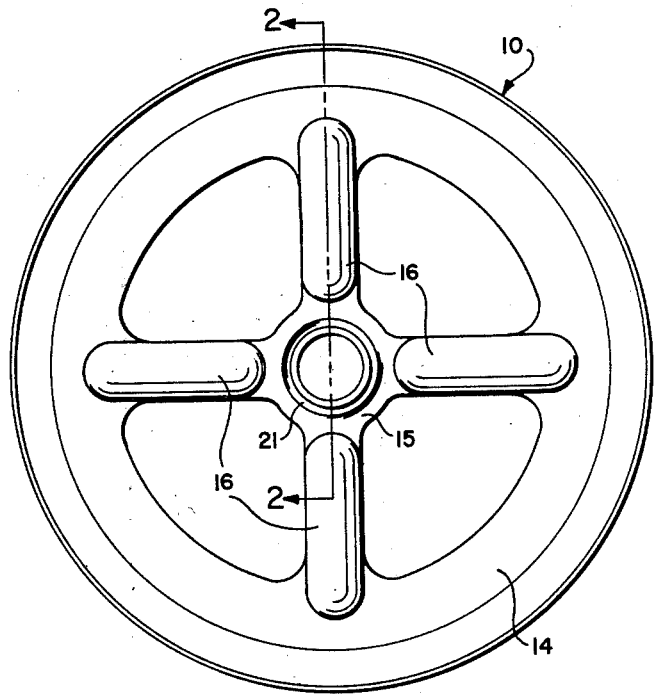
FIGURE 1 is an elevational view of the side of the pulley of the invention.

The illustrated pulley half-sections 11, 12 are stamped from sheet metal. As shown in FIGURE 1 the pulley half-sections 11, 12 each comprise an outer rim portion 14, a central disc and hub portion 15 and a plurality of spokes 16 connecting the outer rim portion 14 to the central disc portion 15. The perimeter of the outer rim portion 14 is flared to provide a V-belt groove 17 when the half-sections 11, 12 are assembled together. The V-belt groove 17 forms the drive engaging surface of the pulley. The surface of the central disc portion 15 is approximately in the plane of the outermost edge of the flared outer rim portion 14. Each central disc portion 15 defines a central opening. The pulley half-sections 11, 12 are assembled in an aligned face to face relation with their outer rim portions 14 in an abutting and preferably spot welded relation.

Figure 3:
FIGURE 3 is a cross-sectional view of the spoke members of the pulley of the invention taken along the line 3—3 of FIGURE 2.

Each of the spokes 16 is a vane which is longitudinally "dished." Expressed another way they are curved in transverse cross sections, as shown in FIGURE 3. Additionally the spokes are arranged in pairs so that the spokes of the sections are aligned with one another in an axial direction.

Figure 4:
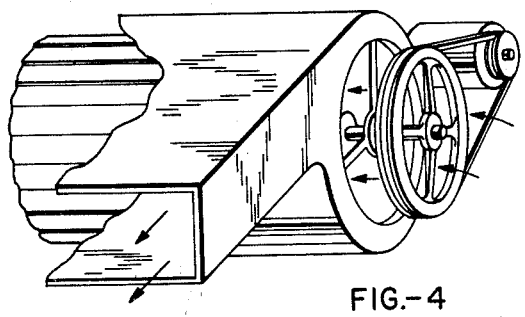
FIGURE 4 is a perspective view, partially in section, of a squirrel cage furnace blower employing the pulley of the invention.

When the pulley is mounted for use, as for example, to turn a squirrel cage blower as shown in FIGURE 4, the convex side of each of the spokes faces away from the blower and each concave side face therefore is toward the blower housing inlet. The flow of air through the pulley is from the convex surface of the spoke members 16 of half-section 11 to the convex surface of the spokes of the half-section 12, or as shown by the arrows in FIGURE 2, from left to right.

Curving the spokes in this manner not only provides less resistance to the air drawn through the pulley, but also pulls additional air through the pulley. These curved spokes on aligned half-sections effectively provide a reversible fan which operates in either direction of rotation with equal facility. Experimentation has shown that the flow of air through the pulley of the invention is about four times better than that through the same pulley without the vaned spokes. In many applications, such as forced air furnaces, the increased flow of air through the driving pulley has permitted a smaller size blower to be used. It is believed that the thus improved air flow is obtained because the spokes each act like an air foil creating a reduced pressure area between the spokes and on the downstream side of the pulley so that the pressure of the ambient atmosphere will force air through the apertures in the pulley.

The hub 13 is interposed between the pulley half sections 11, 12 and maintains the central disc portions in their spaced parallel relation. In the arrangement shown, a portion of the hub ends protrudes through the central opening in each half-section 11, 12. The center hub 13 is made of a formable material and is rigidly locked to the pulley half-sections 11, 12 by crimping, spinning, peening or otherwise forming the protruding portions of the hub. For illustration purposes, FIGURE 2 shows only the right side of the protruding portion of hub 13 locked to the pulley half-section 12 in the manner just described.

A locking rib 21 is provided near the edge of the central opening of both pulley sections 11, 12 to assure the fixed connection of the sections to the hub 13. The rib may be segmented but is annular in its preferred form shown in FIGURE 2. The locking rib 21 is formed from the pulley section at the time it is stamped from sheet metal. In locking the hub 13 to the pulley sections 11, 12 the protruding portion of each hub end is formed to overlap and interlock with the locking rib of the corresponding pulley section. Once interlocked in this manner there can be no slip or other relative movement between the pulley sections and the hub. The use of locking rib 21 is not limited to pulleys, but is also useful in many other types of wheel assemblies.

Although the specification describes the invention in detail it is believed to comprise essentially a composite pulley assembly having a plurality of pulley sections in face to face aligned relation, each pulley section including an outer rim and drive portion, a central hub and disc portion, a plurality of vaned spokes connecting the outer rim portion to the central hub portion and a convex surface of the vaned spokes of each pulley section facing in the same direction.

The invention further provides a center hub, a portion of which protrudes through a central opening in the central disc portion of the pulley sections. The protruding portion of the hub is formed over a locking rib located on the pulley sections to securely lock the pulley sections to the hub.

Although the invention has been described in its preferred form with a certain degree of particularity, it is understood that the present disclosure of the preferred form has been made only by way of example and that numerous changes in the details of construction and the combination and arrangements of parts may be resorted to without departing from the spirit and the scope of the invention as hereinafter claimed.

What is claimed is:

1. A pulley comprising, an outer rim for engaging a V-belt or the like, a central hub, a plurality of spokes connecting the hub and rim together, said hub, rim and spokes defining a plurality of apertures for the passage of air therethrough, said spokes being arranged in axially spaced pairs, each of the spokes in each pair including a convex surface, and the convex surfaces in each pair being oriented in the same direction whereby the spokes will function as fan blades.

2. A pulley comprising, an outer rim for engaging a V-belt or the like, a central hub, a plurality of spokes connecting the hub and rim together, said hub, rim and spokes defining a plurality of apertures for the passage of air therethrough, said spokes being arranged in axially spaced pairs, each of said spokes being a dished radially elongated vane, the spokes being oriented in the same direction.

3. A device of claim 2 wherein each of the spokes is symmetrical about an axial plane.

4. A composite pulley assembly comprising, a plurality of pulley sections arranged in face to face aligned relation, each of said pulley sections including an outer rim and drive portion, a central hub portion and a plurality of dished spoke portions connecting the outer rim portion to the central hub portion, and the spoke portions each including a convex surface oriented to the same side of the pulley assembly.

5. A pulley assembly comprising a plurality of pulley sections arranged in a face to face relation, each pulley section including an outer rim portion connected to a central disc portion by a plurality of dish-shaped spoke portions, the spoke portions of each pulley section being arranged in complementary pairs, said outer rim portions of said pulley sections being in an abutting relation, a center hub interposed between said pulley sections axially coextensive therewith and maintaining said central disc portions in a spaced relation and at least one of said pulley sections being securely locked to said center hub member.

6. A wheel assembly comprising, a plurality of wheel sections arranged in face to face relation, each wheel section including an outer rim and drive portion and an inner central portion, at least one of said central portions including a central opening and a rib spaced from said central opening, and defining at least segments of an annulus around the opening, a hub member interposed between said wheel sections axially coextensive therewith and maintaining said wheel sections in their spaced parallel relation, the ends of said hub protruding through and beyond said one central opening to the outside of each of said wheel sections, and said protruding hub portion overlapping and interlocking with said annular rib to fixedly lock said wheel sections to said central hub.

7. A composite wheel assembly comprising a plurality of wheel sections arranged in face to face relation, each of said wheel sections comprising an outer drive engaging surface and a central hub portion, each of said central hub portions including an opening and a locking rib projection formed therein radially spaced from said central opening, a hub member interposed between said wheel sections and axially coextensive therewith, said hub having end portions, each protruding through and beyond one of said central openings to the outside of each of said wheel sections, and said protruding portion being in tight overlying relationship with said rib projections to rigidly secure said wheel sections to said hub member.

8. A composite pulley assembly comprising a plurality of pulley sections arranged in face to face aligned relation, each pulley section comprising an outer drive engaging surface connected to a central disc portion by intermediate spoke portions, the spoke portions each including convex surfaces facing to the same side of the pulley, each of said central disc portions including at least one of the sections including locking rib means disposed near the central opening of each pulley section, a hub member interposed between said pulley sections and maintaining said pulley sections in their spaced relation, said hub member including a portion protruding through said central opening beyond the outside surface of said one pulley section and said protruding portion being formed to overlap and interlock with said locking rib means to securely lock said pulley sections to said hub member.

9. A pulley comprising, an outer rim, a central hub, a plurality of spoke means connecting the hub and rim together, said hub, rim and spoke means defining a plurality of apertures for the passage of air through the pulley, and each of the spokes including a convex surface relative to the plane of the pulley for unidirectional air propulsion of air through said openings in a direction and unaffected by the direction of rotation whereby the spokes will function to enhance the flow of air through the pulley in one direction in either direction of pulley rotation.

10. A composite pulley assembly comprising a pulley section including an outer drive-engaging surface and a central disc portion, the central disc portion including an opening and a locking rib projection formed therein radially spaced from said central opening, a hub member having an end portion protruding through and beyond said central opening, the protruding portion of said hub being in tight overlying relationship with said rib projection to rigidly secure said wheel section to said hub member.

References Cited in the file of this patent

UNITED STATES PATENTS

| | | |
|---|---|---|
| 1,211,541 | Carle | Jan. 9, 1917 |
| 1,669,951 | Stitt | May 15, 1928 |
| 1,672,835 | Wasserfallen | June 5, 1928 |
| 2,857,024 | Lyon | Oct. 31, 1958 |